(12) United States Patent
Plotnikov et al.

(10) Patent No.: US 9,378,182 B2
(45) Date of Patent: Jun. 28, 2016

(54) VECTOR MOVE INSTRUCTION CONTROLLED BY READ AND WRITE MASKS

(71) Applicant: Intel Corporation, Santa Clara, CA (US)

(72) Inventors: Mikhail Plotnikov, Nizhny Novgorod (RU); Andrey Naraikin, Nizhny Novgorod (RU); Christopher Hughes, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 811 days.

(21) Appl. No.: 13/630,118

(22) Filed: Sep. 28, 2012

(65) Prior Publication Data

US 2014/0095828 A1 Apr. 3, 2014

(51) Int. Cl.
*G06F 15/00* (2006.01)
*G06F 15/76* (2006.01)
*G06F 15/80* (2006.01)
*G06F 9/38* (2006.01)

(52) U.S. Cl.
CPC .......... *G06F 15/8084* (2013.01); *G06F 9/3885* (2013.01)

(58) Field of Classification Search
CPC ................... G06F 15/8084; G06F 9/30036
USPC .......................................................... 712/5
See application file for complete search history.

(56) References Cited

U.S. PATENT DOCUMENTS 5,511,210 A * 4/1996 Nishikawa et al. ............... 712/5

FOREIGN PATENT DOCUMENTS

| DE | 112013004783 T5 | 6/2015 |
| JP | 2015528610 A | 9/2015 |
| KR | 1020157003735 | 4/2015 |

OTHER PUBLICATIONS

CN Publication No. CN104603746A, published May 6, 2015, Notice Publication and Entering into Substantive Examination Procedure of Application of Patent for Invention.

* cited by examiner

*Primary Examiner* — Chun-Kuan Lee
(74) *Attorney, Agent, or Firm* — Nicholson De Vos Webster & Elliot, LLP

(57) ABSTRACT

A processor executes a vector move instruction to move data elements from a second vector register to a first vector register under the control of a first mask register and a second mask register. A register file within the processor includes the first vector register, the second vector register, the first mask register and the second mask register. In response to the vector move instruction, execution circuitry in the processor is to replace a given number of target data elements in the first vector register with the given number of source data elements in the second vector register. Each source data element corresponds to a mask bit in the second mask register having a second bit value, and wherein each target data element corresponds to a mask bit in the first mask register having a first bit value.

24 Claims, 15 Drawing Sheets

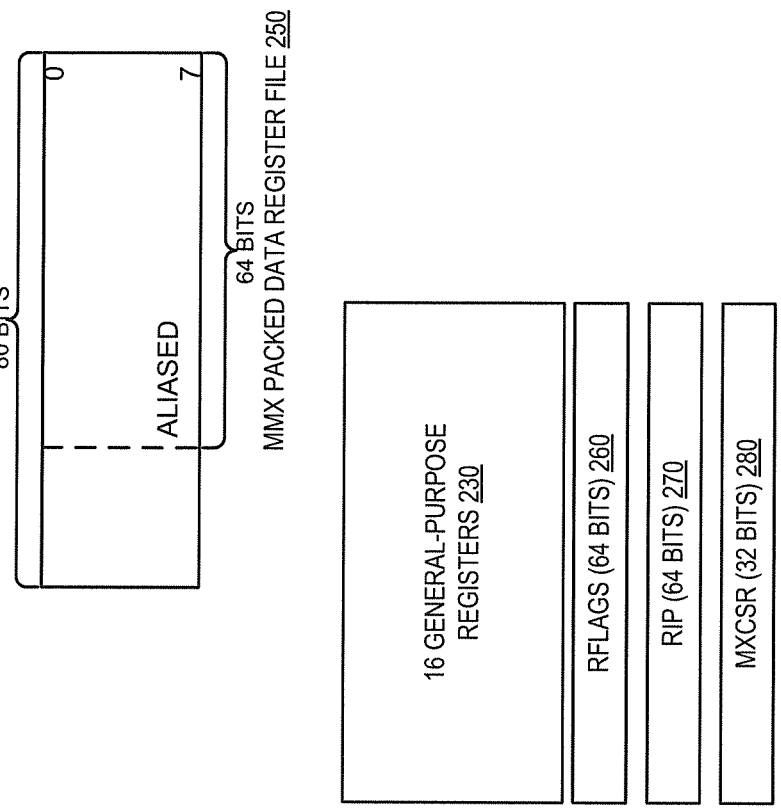
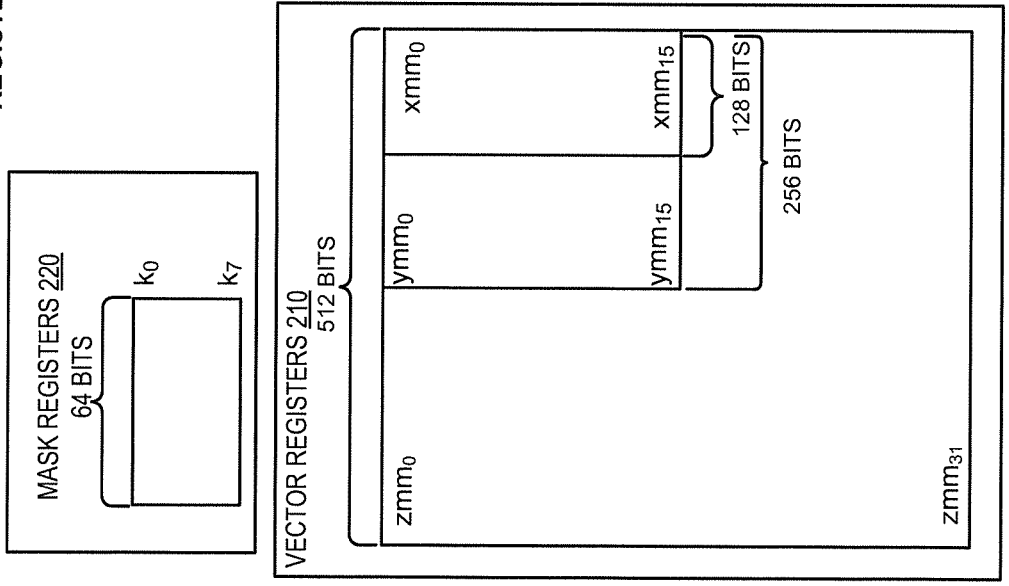
REGISTER ARCHITECTURE 200
FIG. 2

```
rwmaskupdate(K1,K2)                          401
for (i = 0, k = 0; i < KL; i++){
        if (!K1[i]){
                for (; k < KL; k++){
                        if (K2[k]){
                                K2[k] = 0;
                                K1[i] = 1;
                                k++;
                                break;
                        }
                }
        }
} sparsemov(K1,V1,K2,V2)                       402
for (i = 0, k = 0; i < KL; i++){
        if (!K1[i]){
                for(; k < KL; k++){
                        if (K2[k]){
                                V1[i] = V2[k];
                                k++;
                                break;
                        }
                }
        }
}
```

FIG. 4A

```
i = 0;                              //initialize loop counter
v_index = -1:-2:....:-KL+1:-KL       //initial vector of indexes            410
v_KL = KL:KL:....:KL:KL              //increment for vector of indexes
K1 = 0;                              //accumulator is initially empty
K2 = 0;                              //no overflows yet
do{
    if (K2 == 0){                    //if no elements left from previous overflow   420
        V2 = vector_load(X[i+KL-1:i]); //load new KL elements of X array
        K2 = condition(V2);          //generate read mask for new elements
        i += KL;                     //increment loop counter
        v_index += v_KL;             //increment index vector
    }                                //else continue with read mask K2
431— sparsemov(K1, V1, K2, V2);      //add new elements to V1...            430
432— sparsemov(K1, V3, K2, v_index); //and their indexes to V3
433— rwmaskupdate(K1,K2);            //update read and write masks IsFullMask(K1){                  //for full accumulator only            440
        do{
            V1 = computation(V1);    //dense computation over accumulated data
            K1 = condition(V1);      //check condition after computation
        }while(K1 == 0xFFFF)         //check if accumulator is still full (all 1s in K1)
        scatter(knot(K1),V1,V3,X);   //scatter elements from V1 with indexes V3 to X array }
}while((i < N) || (K2 != 0));        //continue when there is more input stream or
                                     //new data in V2
                                     //start remainder computations
K3 = K1;                             //store remainder mask for final scatter  450
do{
    V1{K1} = computation(V1);        //computation under mask K1
    K1 = condition(V1);              //check condition after computation
}while(K1 != 0)                      //check if anything left to do
scatter(K3,V1,V3,X);                 //scatter remaining elements from V1...
                                     //with indexes V3 to X array
```

FIG. 4B

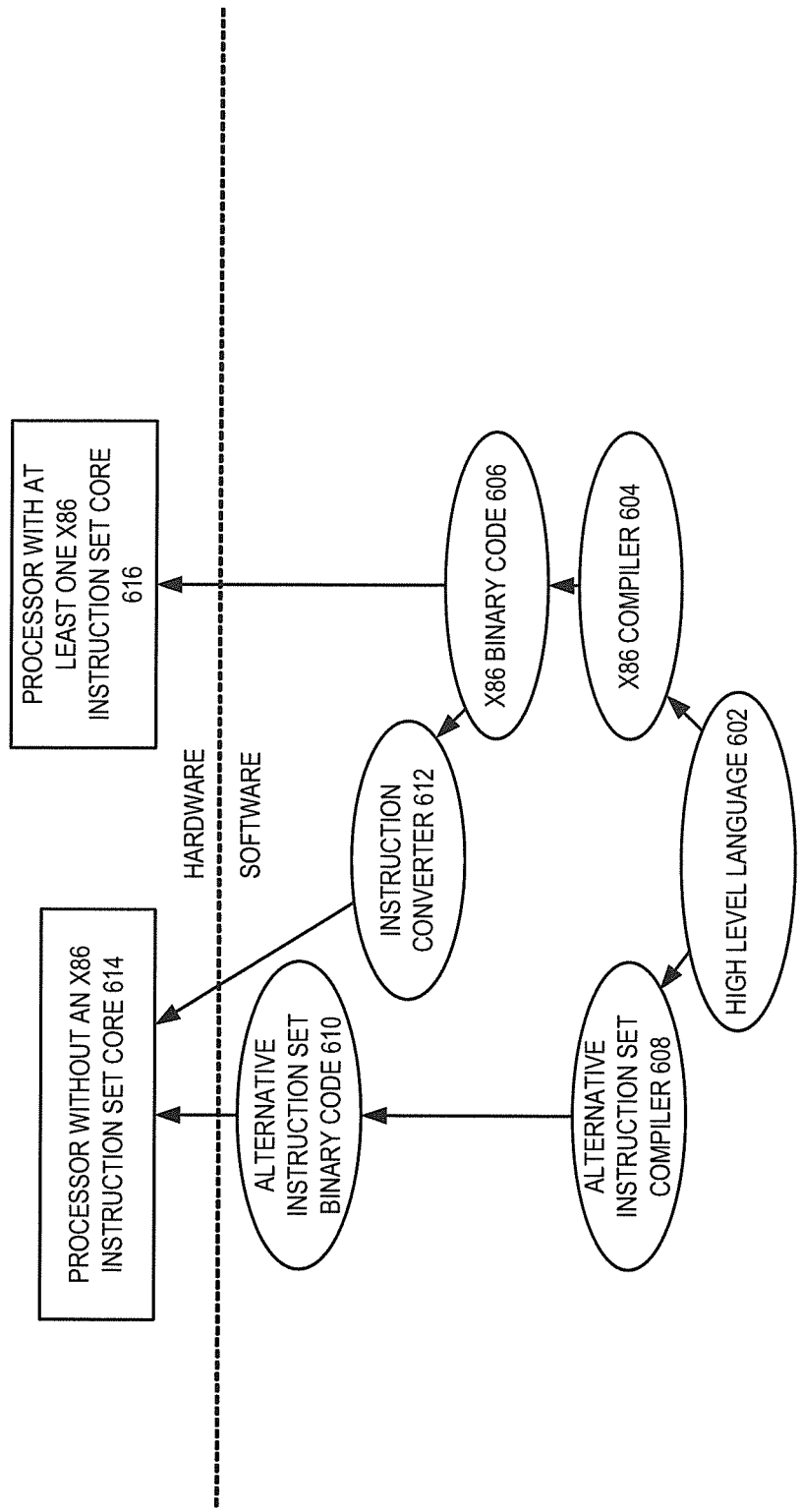

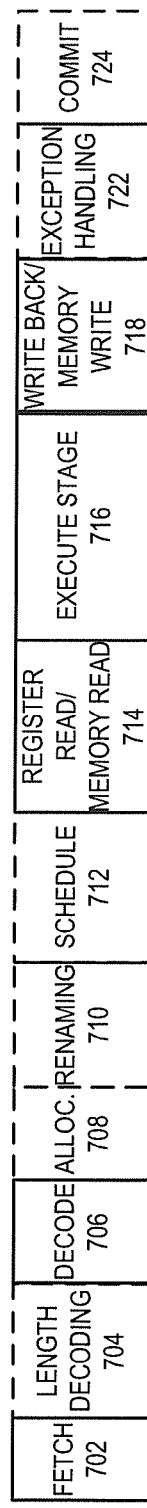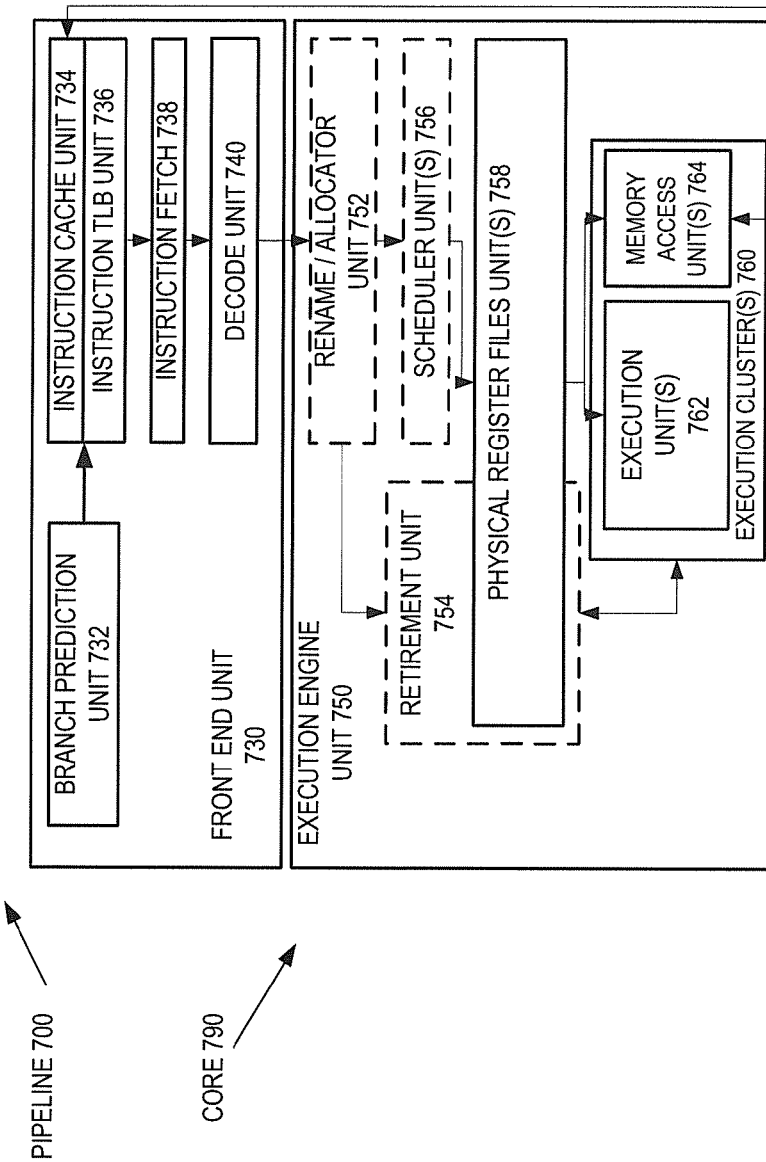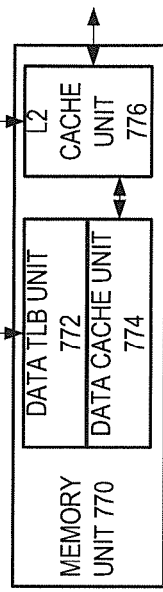
FIG. 7A
FIG. 7B

VECTOR MOVE INSTRUCTION CONTROLLED BY READ AND WRITE MASKS

TECHNICAL FIELD

The present disclosure pertains to the field of processing logic, microprocessors, and associated instruction set architecture that, when executed by the processor or other processing logic, perform logical, mathematical, or other functional operations.

BACKGROUND ART

An instruction set, or instruction set architecture (ISA), is the part of the computer architecture related to programming, and may include the native data types, instructions, register architecture, addressing modes, memory architecture, interrupt and exception handling, and external input and output (I/O). The term instruction generally refers herein to macro-instructions—that is instructions that are provided to the processor (or instruction converter that translates (e.g., using static binary translation, dynamic binary translation including dynamic compilation), morphs, emulates, or otherwise converts an instruction to one or more other instructions to be processed by the processor) for execution—as opposed to micro-instructions or micro-operations (micro-ops)—that is the result of a processor's decoder decoding macro-instructions.

The ISA is distinguished from the micro-architecture, which is the internal design of the processor implementing the instruction set. Processors with different micro-architectures can share a common instruction set. For example, Intel® Core™ processors and processors from Advanced Micro Devices, Inc. of Sunnyvale Calif. implement nearly identical versions of the x86 instruction set (with some extensions that have been added with newer versions), but have different internal designs. For example, the same register architecture of the ISA may be implemented in different ways in different micro-architectures using well-known techniques, including dedicated physical registers, one or more dynamically allocated physical registers using a register renaming mechanism, etc.

Many modern ISAs support Single Instruction, Multiple Data (SIMD) operations. Instead of a scalar instruction operating on only one or two data elements, a vector instruction (also referred to as packed data instruction or SIMD instruction) may operate on multiple data elements or multiple pairs of data elements simultaneously or in parallel. The processor may have parallel execution hardware responsive to the vector instruction to perform the multiple operations simultaneously or in parallel. A SIMD operation operates on multiple data elements packed within one vector register or memory location in one operation. These data elements are referred to as packed data or vector data. Each of the vector elements may represent a separate individual piece of data (e.g., a color of a pixel, etc.) that may be operated upon separately or independently of the others.

In some scenarios, a SIMD operation may operate on independent vector data elements in a recursive manner, where the number of iterations is different for different data elements. Thus, computation for some data elements may be finished while some other data elements still need more iterations. One example of the recursive computation is a WHILE loop operation. In this example, a data array $X[i]$ ($i=0, \ldots, N-1$) of N elements is subject to a recursive computation while the condition ($X[i]$) is true (satisfied). The computation for $X[i]$ terminates when condition ($X[i]$) becomes false. An example of the condition may be $X[i]>0$.

```
for (i=0; i<N; i++){
    while (condition(X[i])){
        X[i]=computation(X[i]);}}
```

The above computation cannot be easily vectorized if the number of the WHILE loop iterations is different for different data elements of $X[i]$. One possible approach is for a processor to perform computation over those elements that do not satisfy the condition, and then throw away the results derived from those elements. However, this approach has low efficiency because the processor not only performs unnecessary computation over those elements, but also is unable to utilize the vector register slots occupied by those elements.

BRIEF DESCRIPTION OF THE DRAWINGS

Embodiments are illustrated by way of example and not limitation in the Figures of the accompanying drawings:

FIG. 2 is a block diagram of register architecture according to one embodiment.

FIG. 4A illustrates an example of pseudo-code for instructions that cause a processor to perform operations on vector registers and mask registers according to one embodiment.

FIG. 4B illustrates an example of a code segment for using the instructions of FIG. 4A according to one embodiment.

FIG. 6 is a block diagram illustrating the use of a software instruction converter to convert binary instructions in a source instruction set to binary instructions in a target instruction set according to one embodiment.

FIG. 7A is a block diagram of an in-order and out-of-order pipeline according to one embodiment.

FIG. 7B is a block diagram of an in-order and out-of-order core according to one embodiment.

DESCRIPTION OF THE EMBODIMENTS

Figure 1:
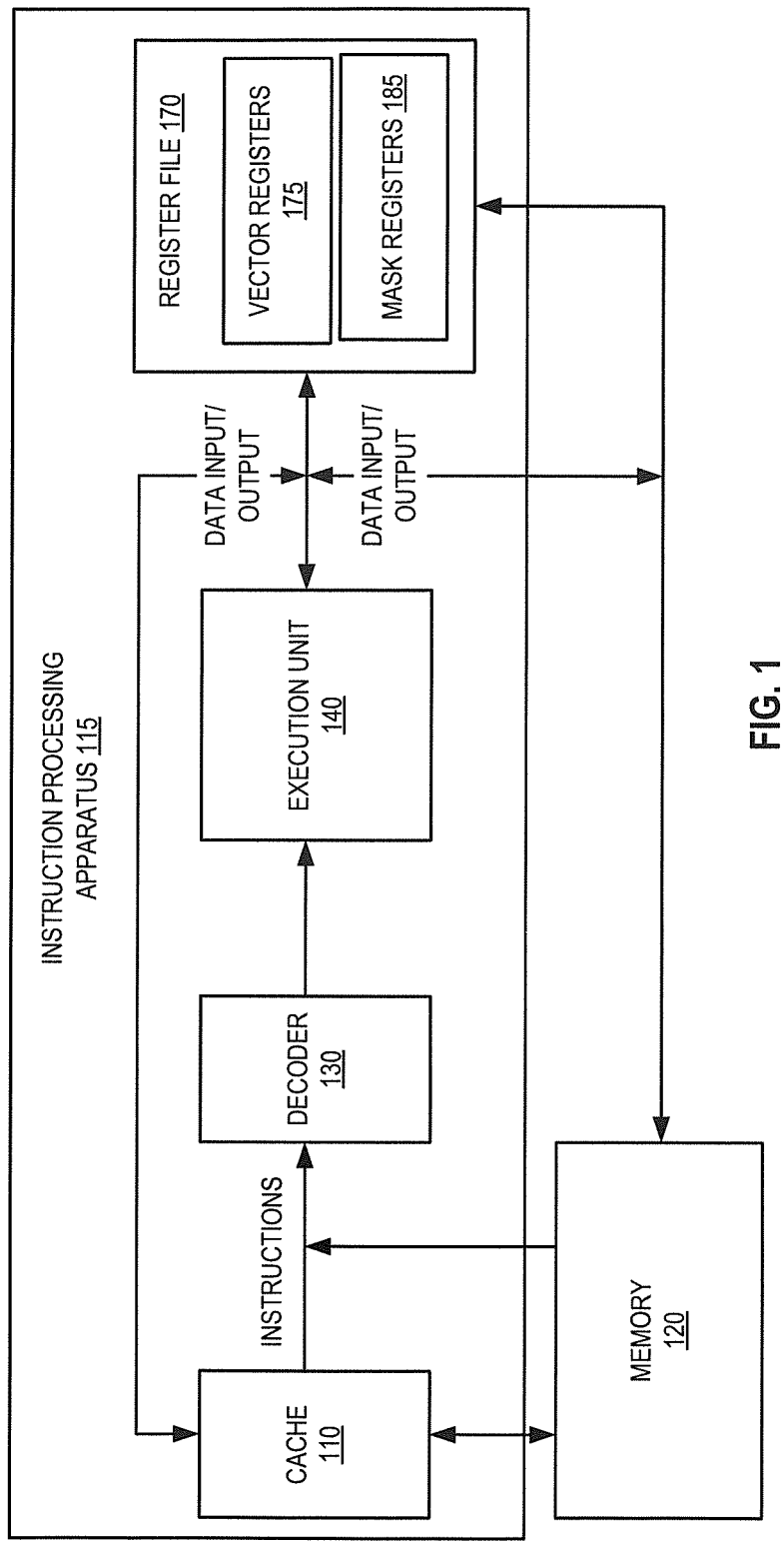
FIG. 1 is a block diagram of an instruction processing apparatus including vector registers and mask registers according to one embodiment.

In the following description, numerous specific details are set forth. However, it is understood that embodiments of the invention may be practiced without these specific details. In other instances, well-known circuits, structures and techniques have not been shown in detail in order not to obscure the understanding of this description.

Embodiments described herein provide instructions for improving the efficiency of recursive vector computation over independent data elements. The instructions utilize a pair of vector registers and a pair of mask registers to perform recursive vector computation, where a first vector register serves as an accumulator to accumulate vector computation results, and a second vector register provides new data elements to fill in the unutilized slots (unused or finished data element positions) of the first vector register. The mask registers are used to indicate which data elements in the corresponding vector registers need further computation.

In one embodiment, the first vector register (i.e., the accumulator) accumulates input data elements until the register is filled up with a full vector. The processor then performs computation on these data elements using non-masked (i.e., dense) vector operations. After the computation, some elements (for which the computation is finished) in the accumulator can be sent back to memory or other storage locations, and other elements (for which the computation has not finished) can be kept in the accumulator for an additional number of iterations. The data element positions of the finished computation in the accumulator can be utilized by new data elements that also need the same recursive computation.

Two instructions RWMASKUPDATE and SPARSEMOV are described herein. These instructions improve the efficiency of vectorization in many scenarios. For example, in one scenario the input data elements may come from one or more sparse vector data sets, each of which does not have enough elements to fill the entire accumulator (i.e., the first vector register). Moreover, input data elements from different data sets may need different numbers of iterations in computation. Thus, unutilized slots are left in the accumulator from those data elements that need no more computation. The instructions described herein allow these unutilized slots to be filled by useful elements, thus enabling recursive computation over a full vector. As will be described in further detail below, the SPARSEMOV instruction is a vector move instruction that moves useful data elements (i.e., data elements that need computation) from a second vector register into the accumulator. The RWMASKUPDATE instruction updates both a read mask register (associated with the second vector register) and a write mask register (associated with the accumulator) to identify the positions of useful data elements in these two vector registers.

The use of RWMASKUPDATE in combination with SPARSEMOV reduces the total number of instructions needed in a recursive computation, and simplifies the overflow and underflow cases where the number of useful data elements (i.e., source data elements) in the second vector register does not match the number of unutilized slots (i.e., target positions) in the first vector register. The updated read and write masks are used to control the data movement between the two vector registers; in particular, write mask bits of zeros are used to identify the target positions in the accumulator, and read mask bits of ones are used to identify the source data elements in the second vector register. The use of inverted write mask bits for identifying the target positions simplifies data accumulation in vectorization of sparse and recursive computation.

FIG. 1 is a block diagram of an embodiment of an instruction processing apparatus 115 having an execution unit 140 that includes circuitry operable to execute instructions, including the RWMASKUPDATE and SPARSEMOV instructions. In some embodiments, the instruction processing apparatus 115 may be a processor, a processor core of a multi-core processor, or a processing element in an electronic system.

A decoder 130 receives incoming instructions in the form of higher-level machine instructions or macroinstructions, and decodes them to generate lower-level micro-operations, micro-code entry points, microinstructions, or other lower-level instructions or control signals, which reflect and/or are derived from the original higher-level instruction. The lower-level instructions or control signals may implement the operation of the higher-level instruction through lower-level (e.g., circuit-level or hardware-level) operations. The decoder 130 may be implemented using various different mechanisms. Examples of suitable mechanisms include, but are not limited to, microcode, look-up tables, hardware implementations, programmable logic arrays (PLAs), other mechanisms used to implement decoders known in the art, etc.

The decoder 130 may receive incoming instructions for a cache 110, a memory 120 or other sources. The decoded instructions are sent to the execution unit 140. The execution unit 140 may receive from the decoder 130 one or more micro-operations, micro-code entry points, microinstructions, other instructions, or other control signals, which reflect, or are derived from the received instructions. The execution unit 140 receives data input from and generates data output to a register file 170, the cache 110, and/or the memory 120.

In one embodiment, the register file 170 includes architectural registers, which are also referred to as registers. Unless otherwise specified or clearly apparent, the phrases architectural registers, register file, and registers are used herein to refer to registers that are visible to the software and/or programmer (e.g., software-visible) and/or the registers that are specified by macroinstructions to identify operands. These registers are contrasted to other non-architectural registers in a given microarchitecture (e.g., temporary registers, reorder buffers, retirement registers, etc.).

To avoid obscuring the description, a relatively simple instruction processing apparatus 115 has been shown and described. It is to be appreciated that other embodiments may have more than one execution unit. For example, the apparatus 115 may include multiple different types of execution units, such as, for example, arithmetic units, arithmetic logic units (ALUs), integer units, floating point units, etc. Still other embodiments of instruction processing apparatus or processors may have multiple cores, logical processors, or execution engines. A number of embodiments of the instruction processing apparatus 115 will be provided later with respect to FIGS. 7-13.

According to one embodiment, the register file 170 includes a set of vector registers 175 and a set of mask registers 185, both of which store the operands of the RWMASKUPDATE and SPARSEMOV instructions. Each vector register 175 can be 512 bits, 256 bits, or 128 bits wide, or a different vector width may be used. Each mask register 185 contains a number of mask bits, with each mask bit corresponding to one data element of one of the vector registers 175. As each mask bit is used to mask a data element of a vector register, a mask register of 64 bits can be used to mask sixty-four 8-bit data elements of a 512-bit register. For a vector register with a different width (e.g., 256 bits or 128 bits) and data elements of a different size (e.g., 16 bits, 32 bits or 64 bits), a different number of mask bits may be used in connection with a vector operation.

FIG. 2 illustrates an embodiment of underlying register architecture 200 that supports the instructions described herein. The register architecture 200 is based on the Intel® Core™ processors implementing an instruction set including x86, MMX™, Streaming SIMD Extensions (SSE), SSE2, SSE3, SSE4.1, and SSE4.2 instructions, as well as an additional set of SIMD extensions, referred to the Advanced Vector Extensions (AVX) (AVX1 and AVX2). However, it is understood different register architecture that supports different register lengths, different register types and/or different numbers of registers can also be used.

In the embodiment illustrated, there are thirty-two vector registers 210 that are 512 bits wide; these registers are referenced as zmm0 through zmm31. The lower order 256 bits of the lower sixteen zmm registers are overlaid on registers ymm0-16. The lower order 128 bits of the lower sixteen zmm registers (the lower order 128 bits of the ymm registers) are overlaid on registers xmm0-15. In the embodiment illustrated, there are eight mask registers 220 (k0 through k7), each 64 bits in length. In an alternate embodiment, the mask registers 220 are 16 bits width.

In the embodiment illustrated, the register architecture 200 further includes sixteen 64-bit general-purpose (GP) registers 230. In an embodiment they are used along with the existing x86 addressing modes to address memory operands. The embodiment also illustrates RFLAGS registers 260, RIP registers 270 and MXCSR registers 280.

The embodiment also illustrates a scalar floating point (FP) stack register file (x87 stack) 240, on which is aliased the MMX packed integer flat register file 250. in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and xmm registers.

Alternative embodiments of the invention may use wider or narrower registers. Additionally, alternative embodiments of the invention may use more, less, or different register files and registers.

Figure 3:
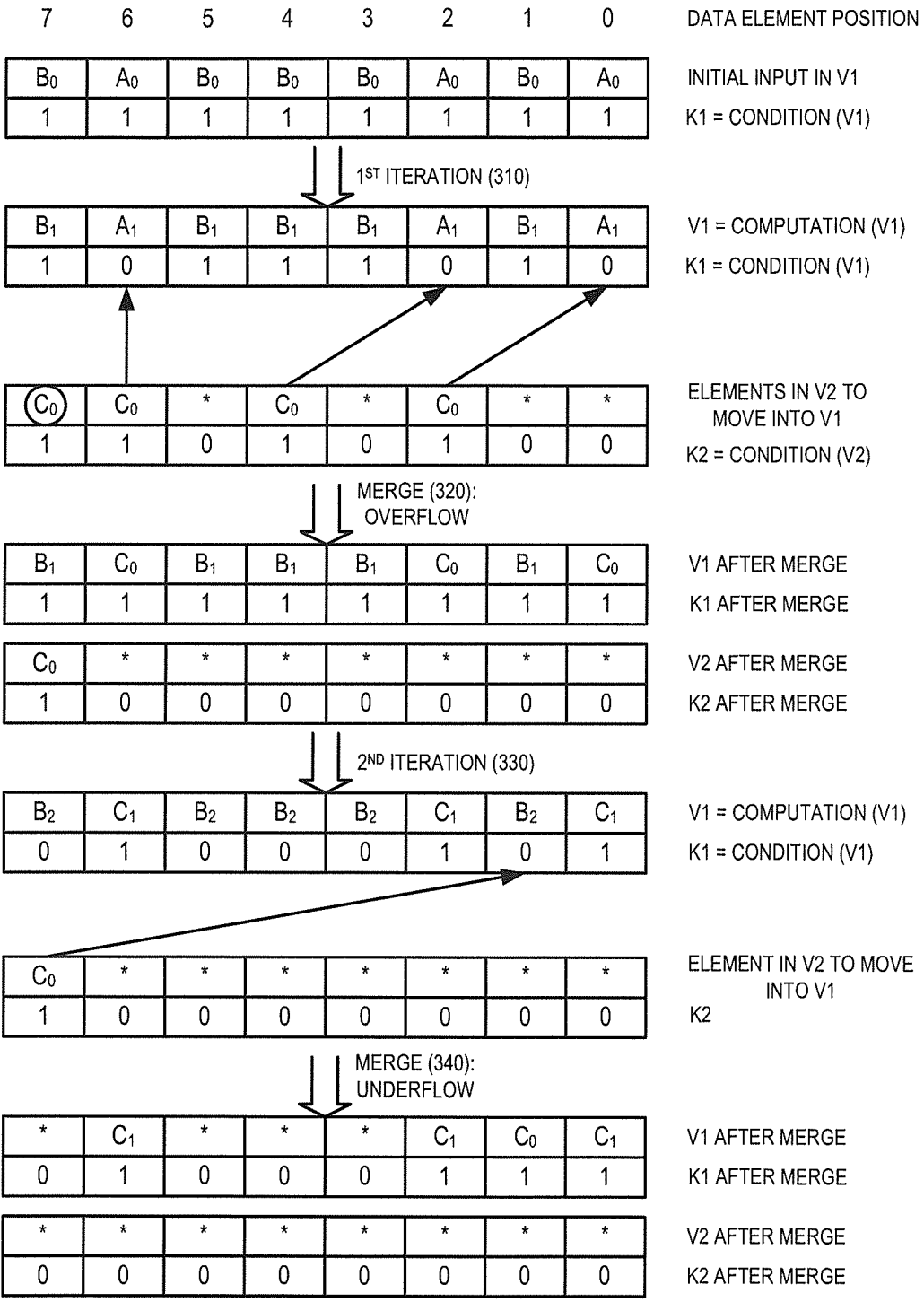
FIG. 3 illustrates an example of a vector operation sequence according to one embodiment.

FIG. 3 is a diagram illustrating an example of the operations performed by a processor (e.g., the instruction processing apparatus 115) to efficiently vectorize the computation over independent data elements. To simplify the illustration, each vector register in this example is shown to have only eight data elements. Alternative embodiments may have a different number of data elements in the vector registers. The vector registers can be 128 bits, 256 bits, or 512 bits wide (e.g., the xmm, ymm or zmm registers of FIG. 2), or a different width may be used. As there are eight data elements in each vector register, only eight mask bits are used in connection with each vector register.

In this example, the vector register V1 is used as an accumulator, and vector register V2 is used to provide new data elements to V1. Mask registers K1 (the write mask) and K2 (the read mask) are used to mask the data elements in V1 and V2, respectively. In this example, a mask bit of zero indicates that the corresponding data element is masked from computation (i.e., no further computation is necessary), and a mask bit of one indicates that the corresponding data element needs further computation. In an alternative embodiment, the meaning of the mask bit value may be reversed; e.g., a mask bit of one may be used to indicate that the corresponding data element needs no further computation, and a mask bit of zero may be used to indicate that the corresponding data element needs further computation.

Initially, it is assumed that the accumulator V1 stores two sets of data as the input vector: A and B, each of which may be part of a sparse data array. The subscript j of $A_j$ and $B_j$ indicates the number of iterations that a data element has gone through; e.g., $A_0$ is the element of A before any iterations, and $A_1$ is the element of A after a first iteration 310. To simplify the illustration, different data elements from the same data set in the same iteration are shown to have the same identifier; e.g., $A_0$ in position 0 and $A_0$ in position 2 of the input vector are two different elements and may have the same or different values, and $B_0$ in position 1 and $B_0$ in position 3 of the input vector are two different elements and may have the same or different values. The initial values of the mask bits in the mask register K1 are all ones, indicating that the initial input vector in V1 is a full vector and that every element of V1 can participate in the first iteration 310 of the vector computation.

In this example, each iteration represents an iteration of a WHILE loop in which a recursive vector computation is performed. After the first iteration 310, the accumulator V1 includes a set of $A_1$'s and $B_1$'s, where the subscript indicates that these elements have finished the first iteration. Assume that elements of A only need one iteration of the WHILE loop and elements of B need two iterations. Thus, after one iteration of the WHILE loop, the computation for the A elements has finished while one more iteration is needed for the B elements. At this point, the condition for each of the A elements is false (because they do not satisfy the condition for further computation), and the condition for each of the B elements is true (because they satisfy the condition for further computation). Thus, the mask bit values in K1 are set to zeros for those mask bits corresponding to $A_1$'s, and ones for those mask bits corresponding to $B_1$'s.

In one embodiment, a mask bit of zero indicates that the result in the corresponding element position will be thrown away after a vector operation over the entire vector register (in this case, V1). In alternative embodiments, a mask bit of zero indicates that the computation for the corresponding element position will not be performed and therefore that element position is unutilized. In either scenario, keeping $A_1$'s in the accumulator V1 is a waste of vector resources and reduces the efficiency of the vector computation. Therefore, according to one embodiment of the invention, a second vector register V2 is used to provide new data elements to V1 to fill the unutilized slots (i.e., the data element positions) left by $A_1$'s. The data elements of $A_1$'s can be saved into memory, cache or other data storage.

In the example of FIG. 3, the vector register V2 stores elements of a data set C, which may be part of another sparse vector array. The positions in V2 marked with "*" represent "don't care," which means that they do not contain useful data elements for the purpose of the recursive vector computation. Assume that each data element of C needs to go through three iterations of the WHILE loop. Instead of or in addition to the elements of C, V2 may provide new data elements of A and/or B (e.g., $A_0$'s, $B_0$'s and/or $B_1$'s) that need to go through one or more iterations of the WHILE loop (and therefore further computation). These data elements in V2 that need further computation are referred to as "source data elements." These source data elements in V2 can fill in the unutilized slots in V1 left by $A_1$'s (referred to as "target data elements"). For ease of description, data elements in V1 and/or V2 that need further computation are referred to as "useful data elements." Thus, a merge operation 320 is performed to merge the useful data elements in V1 and V2, such that the source data elements in V2 are moved to the positions in V1 occupied by the target data elements, and that the recursive computation can proceed to a second iteration 330 with additional useful data elements in V1.

Three scenarios may occur in such a merge operation: overflow, underflow and exact match. An exact match indicates that there is the same number of useful data elements in V2 as the number of unutilized slots left in V1. Thus, in an exact match, all of the source data elements in V2 move into (i.e., replace) the unutilized slots left in V1. As a result, V1 has a full vector to start the next iteration, and K1 is updated to contain all ones. There is no more source data element left in V2, and K2 is updated to contain all zeros.

The merge operation 320 illustrates an overflow scenario in which the number of new data elements ($C_0$) is greater than the number of the zero-value mask bits in K1 (i.e., the number of $A_1$). Thus, not all of the new data elements in V2 can move into V1. In this example, the encircled $C_0$ in position 7 of V2 is left in V2, while the other $C_0$'s in positions 2, 4 and 6 have moved into V1. In this embodiment, the lower-order elements of V2 are moved into V1; in alternative embodiments, the higher-order elements of V2 may be moved into V1. The merge operation 320 also updates the corresponding mask bits in K1 and K2.

After the merge operation 320, V1 contains a full vector of eight elements to start the second iteration 330, and V2 only has one $C_0$ left in position 7. The corresponding mask register K1 at this point (after the merge operation 320) contains all ones, and K2 contains only one mask bit having a value of one in position 7.

After the second iteration 330, the accumulator V1 contains a combination of $B_2$'s and $C_1$'s. As the computation for the B elements has finished after this iteration, those $B_2$'s can be saved into memory, cache or other data storage. Thus, the condition for each of B elements is false (because they do not satisfy the condition for further computation), and the condition for each of the C elements is true (because they satisfy the condition for further computation). Thus, the mask bit values in K1 are set to zeros for those mask bits corresponding to $B_2$'s, and ones for those mask bits corresponding to $C_1$'s.

The unutilized slots left by $B_2$'s can be filled by the remaining source data elements in V2; in this case, $C_0$ in position 7 of V2. However, as there is a smaller number of $C_0$'s than the number of $B_2$'s, an underflow occurs in a subsequent merge operation 340. In the underflow scenario shown in FIG. 3, the lowest-order $B_2$ in V1 is replaced by $C_0$; in alternative embodiments, the highest-order $B_2$ in V1 may be replaced by $C_0$. The merge operation 340 also updates the corresponding mask bits in K1 and K2.

After the merge operation 340, the accumulator V1 is not completely filled, and V2 does not have any more useful data elements that can move into V1. The mask register K1 at this point (after the merge operation 340) contains ones in the positions corresponding to the C elements, and K2 contains all zeros. V2 may load additional useful data elements to be moved into V1 and the merge operations of 320 and/or 340 can be repeated, until all of the useful data elements are processed and no more source data elements are left in V2. At this point, V1 may go through a number of additional iterations until all of the elements in V1 reach the required number of iterations.

It is understood that the meaning of mask bit values of zeros and ones can be reversed from what is shown in the example of FIG. 3; e.g., a mask bit value of zero can be used to mean that a condition is satisfied and a mask bit value of one can be used to mean that the condition is not satisfied. In some embodiments, the meaning of K1 mask bit values can be reversed from the meaning of K2 mask bit values; e.g., a K1 mask bit value of one can be used to mean that a condition is not satisfied and a K2 mask bit value of one can be used to mean that the condition is satisfied. Thus, different mask bit values can be used in the example of FIG. 3 for the same scenario, as long as the meaning of each mask bit in each mask register is consistently defined to allow consistent interpretation.

According to one embodiment of the invention, the operations described in connection with FIG. 3 are performed by a processor (e.g., the instruction processing apparatus 115) in response to the vector instructions that include RWMASKUPDATE and SPARSEMOV instructions. The SPARSEMOV instruction can be used to move source data elements from vector register V2 into vector register V1, replacing the target elements in V1 that do not satisfy a condition (e.g., elements that need no more computation). The RWMASKUPDATE instruction can be used to update the mask registers K1 and K2 to thereby identify the positions of the data elements in V1 and V2, respectively, that satisfy a condition (e.g., elements that need more computation). In one embodiment, RWMASKUPDATE has two operands K1 and K2, and SPARSEMOV has four operands K1, V1, K2 and V2. In alternative embodiments, some of the operands of RWMASKUPDATE and/or SPARSEMOV may be implicit.

FIG. 4A shows an example of pseudo-code 401 and 402 for the RWMASKUPDATE and SPARSEMOV instructions according to one embodiment. In the pseudo-code 401 and 402, KL represents the vector length, which is the total number of data elements in each vector register (e.g., each of V1 and V2). If a zmm register is used as the accumulator with 8-bit data elements, KL=512/8=64. Pseudo-code 401 describes the RWMASKUPDATE instruction, and pseudo-code 402 describes the SPARSEMOV instruction. It is noted that a processor may implement the RWMASKUPDATE and SPARSEMOV instructions with operations or logic different from what is shown in the pseudo-code 401 and 402.

The RWMASKUPDATE and SPARSEMOV instructions update mask registers and move data elements between vector registers, respectively. Additional instructions can be executed to utilize results of these instructions to thereby perform recursive vector computation more efficiently. FIG. 4B illustrates an example of a code segment 400 that uses RWMASKUPDATE and SPARSEMOV instructions according to one embodiment. The code segment 400 when executed by a processor causes the processor to perform recursive vector computation over independent data elements of an array X. The array X may be stored in the memory, cache or other data storage locations. The code segment 400 includes an initialization section 410, an initial merge section 420, a subsequent merge section 430, a computation section 440 and a remainder section 450. Operations in each of the sections 410-450 are described below with reference to the flow diagram of FIG. 5A, which illustrates an embodiment of a method 500 performed by a processor (e.g., the instruction processing apparatus 115 of FIG. 1).

In the initialization section 410, both mask registers K1 and K2 are initialized to zero, indicating no useful data elements are in their corresponding vector registers V1 and V2. The term "useful data elements" means data elements that need computation. Iterations begin at the initial merge section 420, where K2 is first checked to determine whether any useful data elements are left in V2 (block 531). If there is no useful data in V2, input data elements are loaded from array X into V2 (block 532), and their corresponding mask bits in K2 are set accordingly.

The subsequent merge section 430 handles the scenario in which V2 contains useful data elements. The useful data elements may be left in V2 from a previous overflow or may be loaded into V2 in block 532. Responsive to the SPARSEMOV instruction 431, these useful data elements in V2 are moved into V1 according to the mask bits in K1 and K2 (block 533). Responsive to the RWMASKUPDATE instruction 433, the mask registers K1 and K2 are updated to identify the current positions of the useful data elements in V1 and V2, respectively, after the move in block 533 (block 534).

In the subsequent merge section 430, a second SPARSEMOV instruction 432 is executed to store the indexes (positions) of the data elements in array X that were moved from V2 into V1, such that results of the computation can be stored back to their original positions in array X.

The computation section 440 handles the vector computation of a full vector (as indicated by the corresponding mask being all ones; i.e., when IsFullMask (K1) is true). If V1 does not have a full vector of useful data elements (block 535) and there are input data elements that have not been loaded into V1 (block 538), it indicates that additional input data elements can to be loaded into V1 via V2 (blocks 532-534). If V1 does not have a full vector and there are no more input data elements to be loaded into V1 (block 538), it indicates that the operations proceed to the remainder section 450 where remaining data elements in V1 are computed until computation is finished and results are saved back to array X (block 539).

If V1 has a full vector of useful data elements (block 535), vector computation can be performed on V1 (block 536). The mask register K1 is updated if any data elements in V1 need no more computation. The vector computation continues until one or more data elements in V1 need no more computation (as indicated by corresponding zero-value mask bits in K1); at that point those data elements are saved back to array X (block 537). In the embodiment as shown, the data elements can be saved with a SCATTER instruction, and zero-value mask bits in K1 can be identified using a function knot (K1). Except for the RWMASKUPDATE and SPARSEMOV instructions, the specific instructions and functions used in the code segment 400, such as SCATTER, knot, IsFullMask, etc., can be emulated by alternative instruction sequences.

The operations of blocks 531-537 are repeated until there are no more input data elements to be loaded into V1 through V2 (block 538); i.e., when all of the input data elements in array X have been loaded into V2 and all of the useful data elements in V2 have been moved into V1. This is when the remainder section 450 begins. At this point, V1 may not have a full vector of useful data elements but those data elements in V1 need further computation. The vector computation continues until all of the remaining data elements in V1 reach the required number of iterations (block 539). At this point, the computation result in V1 can be saved back into array X (e.g., using a SCATTER instruction) (block 539).

Figure 5A:
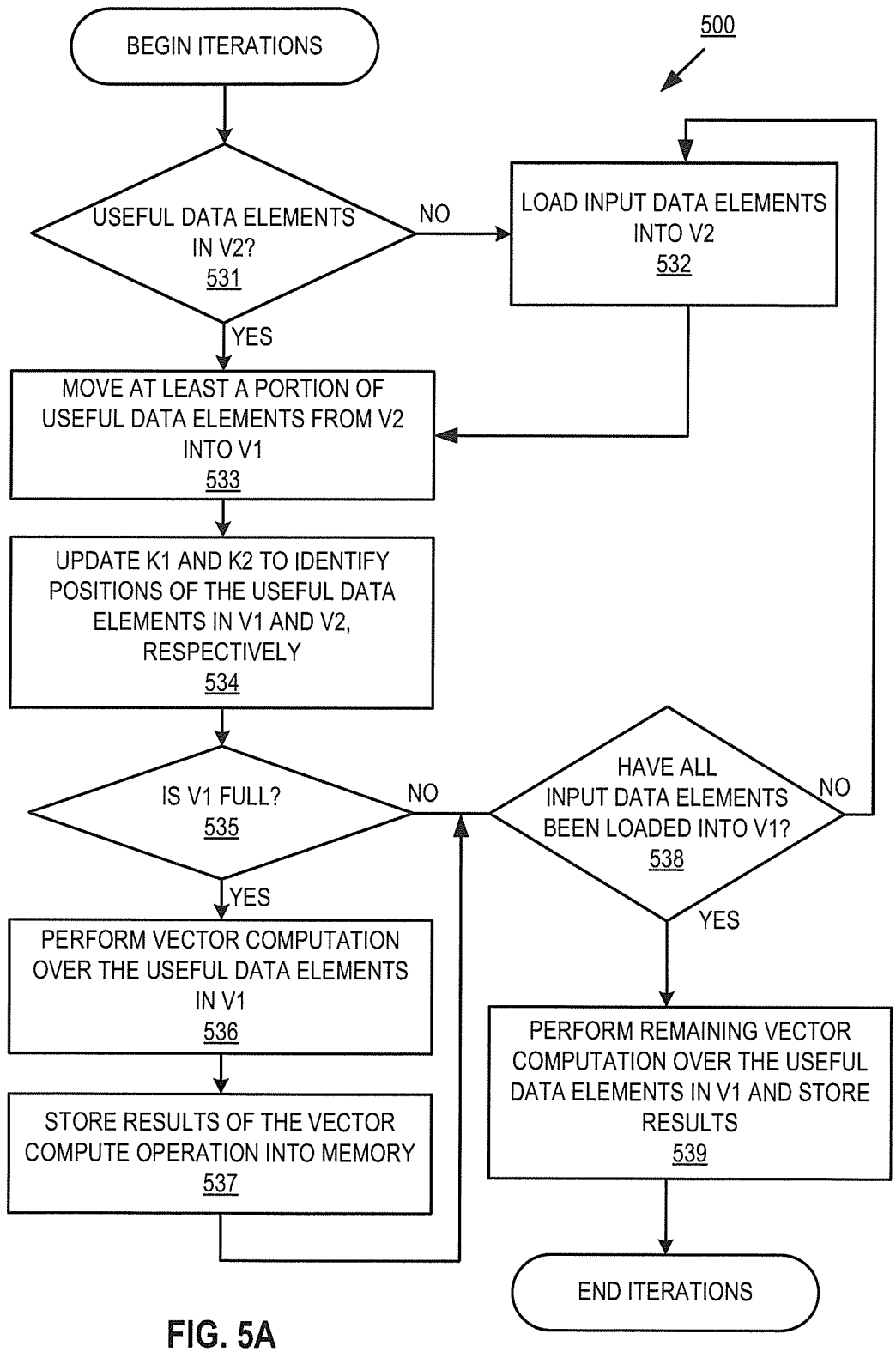
FIG. 5A is a flow diagram illustrating operations to be performed responsive to a code segment that uses the mask update instruction and the vector move instruction according to one embodiment.
Figure 5B:
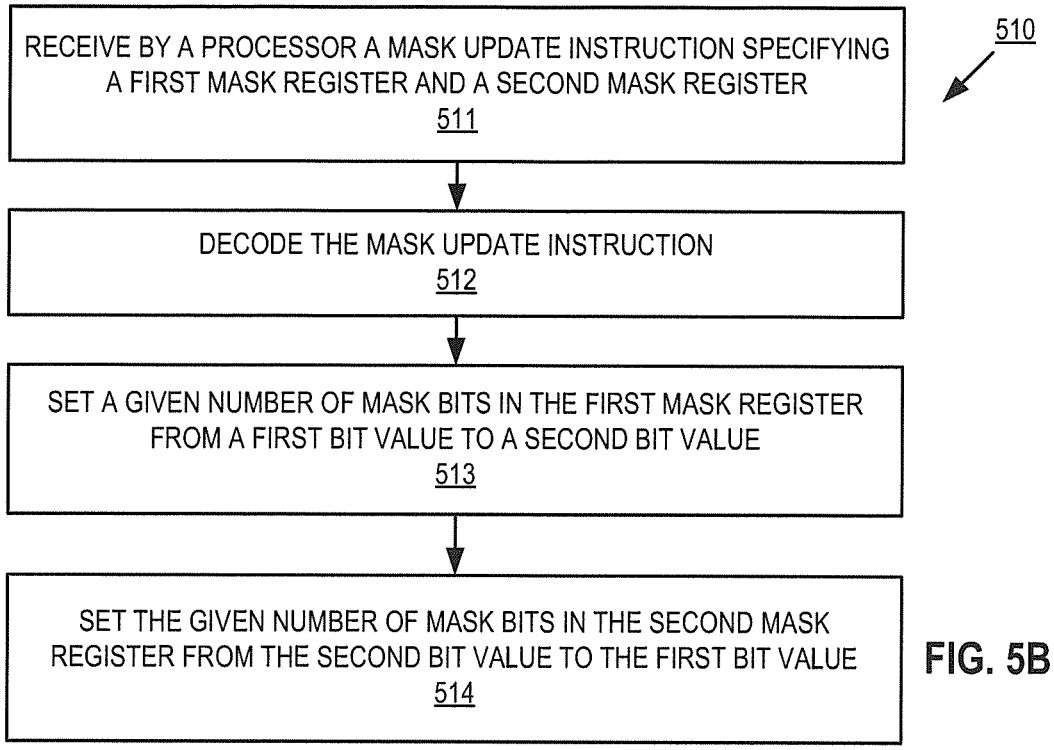
FIG. 5B is a flow diagram illustrating operations to be performed responsive to a mask update instruction according to one embodiment.

FIG. 5B is a block flow diagram of a method 510 for executing the RWMASKUPDATE instruction according to one embodiment. The method 510 begins with a processor (e.g., the instruction processing apparatus 115 of FIG. 1) receiving a mask update instruction specifying a first mask register and a second mask register (block 511). The processor decodes the mask update instruction (block 512). In response to the decoded mask update instruction, the processor performs the operations including: inverting a given number of mask bits in the first mask register; for example, by setting these mask bits from a first bit value (e.g., zero) to a second bit value (e.g., one) (block 513); and inverting the given number of mask bits in the second mask register; for example, by setting these mask bits from the second bit value (e.g., one) to the first bit value (e.g., zero) (block 514). The given number is the smaller one of the number of mask bits in the first mask register having the first bit value and the number of mask bits in the second mask register having the second bit value. In an alternative embodiment, the first bit value may be one and the second bit value may be zero.

Figure 5C:
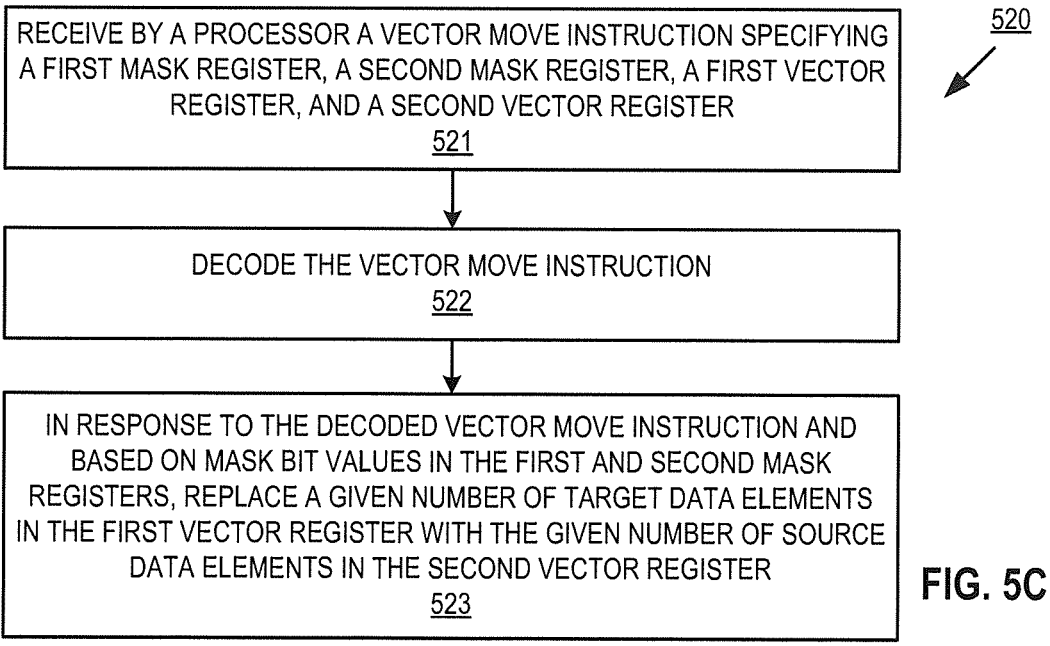
FIG. 5C is a flow diagram illustrating operations to be performed responsive to a vector move instruction according to one embodiment.

FIG. 5C is a block flow diagram of a method 520 for executing the SPARSEMOV instruction according to one embodiment. The method 520 begins with a processor (e.g., the instruction processing apparatus 115 of FIG. 1) receiving a vector move instruction specifying a first mask register, a second mask register, a first vector register, and a second vector register (block 521). The processor decodes the vector move operation (block 522). In response to the decoded vector move instruction and based on the mask bit values in the first and second mask registers, the processor replaces a given number of target data elements in the first vector register with the given number of source data elements in the second vector register (block 523). In one embodiment, each source data element corresponds to a mask bit in the second mask register having a second bit value (e.g., one), and wherein each target data element corresponds to a mask bit in the first mask register having a first bit value (e.g., zero). In an alternative embodiment, the first bit value may be one and the second bit value may be zero. The given number is the smaller one of the number of mask bits in the first mask register having the first bit value and the number of mask bits in the second mask register having the second bit value.

In various embodiments, the methods of FIGS. 5A-C may be performed by a general-purpose processor, a special-purpose processor (e.g., a graphics processor or a digital signal processor), or another type of digital logic device or instruction processing apparatus. In some embodiments, the methods of FIGS. 5A-C may be performed by the instruction processing apparatus 115 of FIG. 1, or a similar processor, apparatus, or system, such as the embodiments shown in FIGS. 7-13. Moreover, the instruction processing apparatus 115 of FIG. 1, as well as the processor, apparatus, or system shown in FIGS. 7-13 may perform embodiments of operations and methods either the same as, similar to, or different than those of the methods of FIGS. 5A-C.

In some embodiments, the instruction processing apparatus 115 of FIG. 1 may operate in conjunction with an instruction converter that converts an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

FIG. 6 is a block diagram contrasting the use of a software instruction converter according to embodiments of the invention. In the illustrated embodiment, the instruction converter is a software instruction converter, although alternatively the instruction converter may be implemented in software, firmware, hardware, or various combinations thereof. FIG. 6 shows a program in a high level language 602 may be compiled using an x86 compiler 604 to generate x86 binary code 606 that may be natively executed by a processor with at least one x86 instruction set core 616. The processor with at least one x86 instruction set core 616 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 604 represents a compiler that is operable to generate x86 binary code 606 (e.g., object code) that can, with or without additional linkage processing, be executed on the processor with at least one x86 instruction set core 616. Similarly, FIG. 6 shows the program in the high level language 602 may be compiled using an alternative instruction set compiler 608 to generate alternative instruction set binary code 610 that may be natively executed by a processor without at least one x86 instruction set core 614 (e.g., a processor with cores that execute the MIPS instruction set of MIPS Technologies of Sunnyvale, Calif. and/or that execute the ARM instruction set of ARM Holdings of Sunnyvale, Calif.). The instruction converter 612 is used to convert the x86 binary code 606 into code that may be natively executed by the processor without an x86 instruction set core 614. This converted code is not likely to be the same as the alternative instruction set binary code 610 because an instruction converter capable of this is difficult to make; however, the converted code will accomplish the general operation and be made up of instructions from the alternative instruction set. Thus, the instruction converter 612 represents software, firmware, hardware, or a combination thereof that, through emulation, simulation or any other process, allows a processor or other electronic device that does not have an x86 instruction set processor or core to execute the x86 binary code 606.

Exemplary Core Architectures
In-Order and Out-of-Order Core Block Diagram

FIG. 7A is a block diagram illustrating both an exemplary in-order pipeline and an exemplary register renaming, out-of-order issue/execution pipeline according to embodiments of the invention. FIG. 7B is a block diagram illustrating both an exemplary embodiment of an in-order architecture core and an exemplary register renaming, out-of-order issue/execution architecture core to be included in a processor according to embodiments of the invention. The solid lined boxes in FIGS. 7A and 7B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 7A, a processor pipeline 700 includes a fetch stage 702, a length decode stage 704, a decode stage 706, an allocation stage 708, a renaming stage 710, a scheduling (also known as a dispatch or issue) stage 712, a register read/memory read stage 714, an execute stage 716, a write back/memory write stage 718, an exception handling stage 722, and a commit stage 724.

FIG. 7B shows processor core 790 including a front end unit 730 coupled to an execution engine unit 750, and both are coupled to a memory unit 770. The core 790 may be a reduced instruction set computing (RISC) core, a complex instruction set computing (CISC) core, a very long instruction word (VLIW) core, or a hybrid or alternative core type. As yet another option, the core 790 may be a special-purpose core, such as, for example, a network or communication core, compression engine, coprocessor core, general purpose computing graphics processing unit (GPGPU) core, graphics core, or the like.

The front end unit 730 includes a branch prediction unit 732 coupled to an instruction cache unit 734, which is coupled to an instruction translation lookaside buffer (TLB) 736, which is coupled to an instruction fetch unit 738, which is coupled to a decode unit 740. The decode unit 740 (or decoder) may decode instructions, and generate as an output one or more micro-operations, micro-code entry points, microinstructions, other instructions, or other control signals, which are decoded from, or which otherwise reflect, or are derived from, the original instructions. The decode unit 740 may be implemented using various different mechanisms. Examples of suitable mechanisms include, but are not limited to, look-up tables, hardware implementations, programmable logic arrays (PLAs), microcode read only memories (ROMs), etc. In one embodiment, the core 790 includes a microcode ROM or other medium that stores microcode for certain macroinstructions (e.g., in decode unit 740 or otherwise within the front end unit 730). The decode unit 740 is coupled to a rename/allocator unit 752 in the execution engine unit 750.

The execution engine unit 750 includes the rename/allocator unit 752 coupled to a retirement unit 754 and a set of one or more scheduler unit(s) 756. The scheduler unit(s) 756 represents any number of different schedulers, including reservations stations, central instruction window, etc. The scheduler unit(s) 756 is coupled to the physical register file(s) unit(s) 758. Each of the physical register file(s) units 758 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 758 comprises a vector registers unit, a write mask registers unit, and a scalar registers unit. These register units may provide architectural vector registers, vector mask registers, and general purpose registers. The physical register file(s) unit(s) 758 is overlapped by the retirement unit 754 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 754 and the physical register file(s) unit(s) 758 are coupled to the execution cluster(s) 760. The execution cluster(s) 760 includes a set of one or more execution units 762 and a set of one or more memory access units 764. The execution units 762 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 756, physical register file(s) unit(s) 758, and execution cluster(s) 760 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 764). It should also be understood that where separate pipelines are used, one or more of these pipelines may be out-of-order issue/execution and the rest in-order.

The set of memory access units 764 is coupled to the memory unit 770, which includes a data TLB unit 772 coupled to a data cache unit 774 coupled to a level 2 (L2) cache unit 776. In one exemplary embodiment, the memory access units 764 may include a load unit, a store address unit, and a store data unit, each of which is coupled to the data TLB unit 772 in the memory unit 770. The instruction cache unit 734 is further coupled to a level 2 (L2) cache unit 776 in the memory unit 770. The L2 cache unit 776 is coupled to one or more other levels of cache and eventually to a main memory.

By way of example, the exemplary register renaming, out-of-order issue/execution core architecture may implement the pipeline 700 as follows: 1) the instruction fetch 738 performs the fetch and length decoding stages 702 and 704; 2) the decode unit 740 performs the decode stage 706; 3) the rename/allocator unit 752 performs the allocation stage 708 and renaming stage 710; 4) the scheduler unit(s) 756 performs the schedule stage 712; 5) the physical register file(s) unit(s) 758 and the memory unit 770 perform the register read/memory read stage 714; the execution cluster 760 perform the execute stage 716; 6) the memory unit 770 and the physical register file(s) unit(s) 758 perform the write back/memory write stage 718; 7) various units may be involved in the exception handling stage 722; and 8) the retirement unit 754 and the physical register file(s) unit(s) 758 perform the commit stage 724.

The core 790 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 790 includes logic to support a packed data instruction set extension (e.g., SSE, AVX1, AVX2, etc.), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 734/774 and a shared L2 cache unit 776, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

Figure 8B:
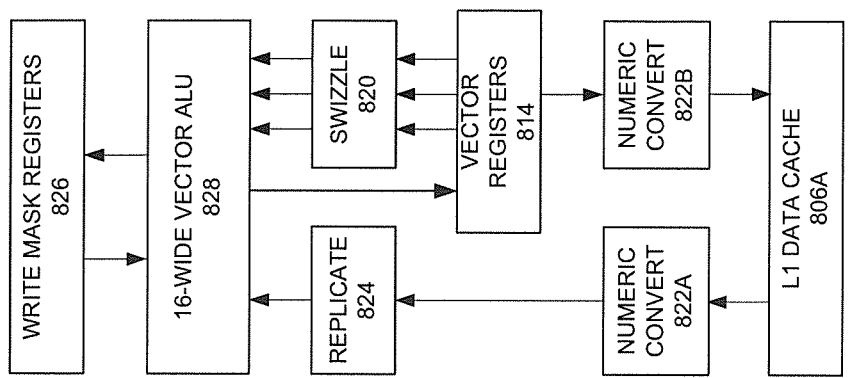
FIGS. 8A-B are block diagrams of a more specific exemplary in-order core architecture according to one embodiment.
Figure 8A:
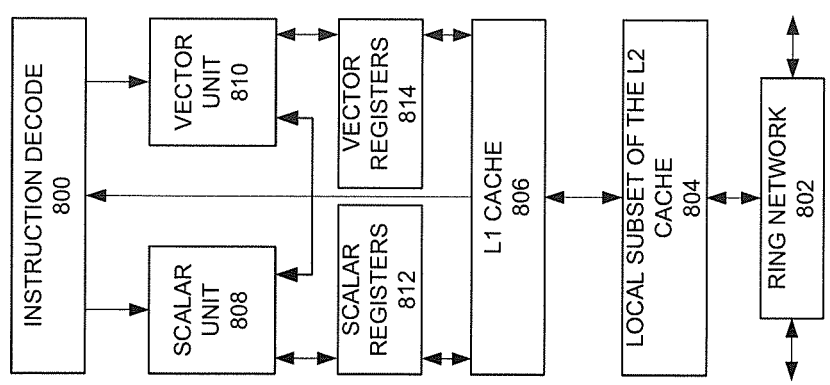

FIGS. 8A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 8A is a block diagram of a single processor core, along with its connection to the on-die interconnect network 802 and with its local subset of the Level 2 (L2) cache 804, according to embodiments of the invention. In one embodiment, an instruction decoder 800 supports the x86 instruction set with a packed data instruction set extension. An L1 cache 806 allows low-latency accesses to cache memory into the scalar and vector units. While in one embodiment (to simplify the design), a scalar unit 808 and a vector unit 810 use separate register sets (respectively, scalar registers 812 and vector registers 814) and data transferred between them is written to memory and then read back in from a level 1 (L1) cache 806, alternative embodiments of the invention may use a different approach (e.g., use a single register set or include a communication path that allow data to be transferred between the two register files without being written and read back).

The local subset of the L2 cache 804 is part of a global L2 cache that is divided into separate local subsets, one per processor core. Each processor core has a direct access path to its own local subset of the L2 cache 804. Data read by a processor core is stored in its L2 cache subset 804 and can be accessed quickly, in parallel with other processor cores accessing their own local L2 cache subsets. Data written by a processor core is stored in its own L2 cache subset 804 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 8B is an expanded view of part of the processor core in FIG. 8A according to embodiments of the invention. FIG. 8B includes an L1 data cache 806A part of the L1 cache 804, as well as more detail regarding the vector unit 810 and the vector registers 814. Specifically, the vector unit 810 is a 16-wide vector processing unit (VPU) (see the 16-wide ALU 828), which executes one or more of integer, single-precision float, and double-precision float instructions. The VPU supports swizzling the register inputs with swizzle unit 820, numeric conversion with numeric convert units 822A-B, and replication with replication unit 824 on the memory input. Write mask registers 826 allow predicating resulting vector writes.

Processor with Integrated Memory Controller and Graphics

Figure 9:
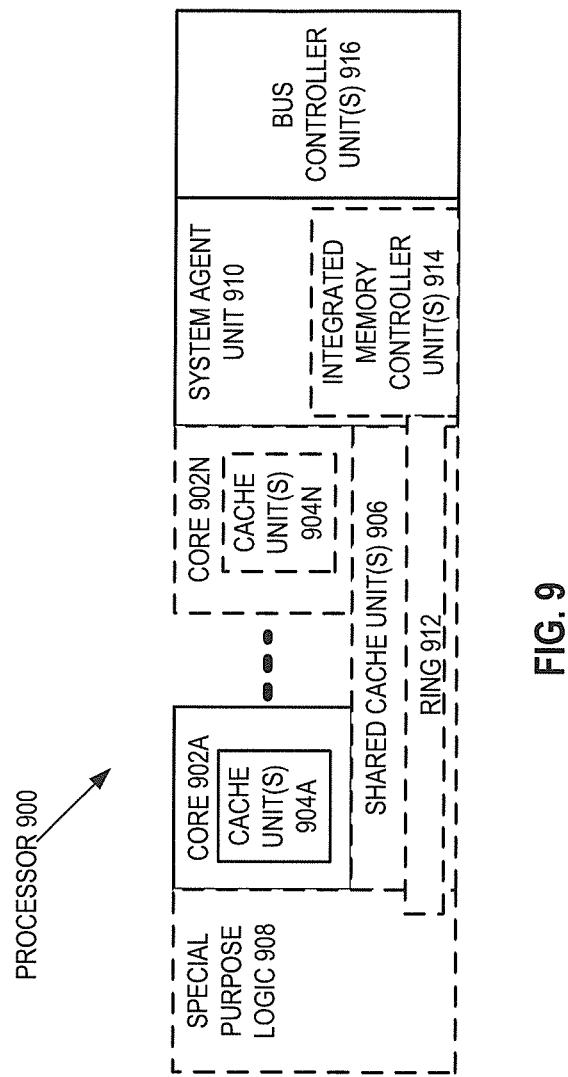
FIG. 9 is a block diagram of a processor according to one embodiment.

FIG. 9 is a block diagram of a processor 900 that may have more than one core, may have an integrated memory controller, and may have integrated graphics according to embodiments of the invention. The solid lined boxes in FIG. 9 illustrate a processor 900 with a single core 902A, a system agent 910, a set of one or more bus controller units 916, while the optional addition of the dashed lined boxes illustrates an alternative processor 900 with multiple cores 902A-N, a set of one or more integrated memory controller unit(s) 914 in the system agent unit 910, and special purpose logic 908.

Thus, different implementations of the processor 900 may include: 1) a CPU with the special purpose logic 908 being integrated graphics and/or scientific (throughput) logic (which may include one or more cores), and the cores 902A-N being one or more general purpose cores (e.g., general purpose in-order cores, general purpose out-of-order cores, a combination of the two); 2) a coprocessor with the cores 902A-N being a large number of special purpose cores intended primarily for graphics and/or scientific (throughput); and 3) a coprocessor with the cores 902A-N being a large number of general purpose in-order cores. Thus, the processor 900 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 900 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 906, and external memory (not shown) coupled to the set of integrated memory controller units 914. The set of shared cache units 906 may include one or more mid-level caches, such as level 2 (L2), level 3 (L3), level 4 (L4), or other levels of cache, a last level cache (LLC), and/or combinations thereof. While in one embodiment a ring based interconnect unit 912 interconnects the integrated graphics logic 908, the set of shared cache units 906, and the system agent unit 910/integrated memory controller unit(s) 914, alternative embodiments may use any number of well-known techniques for interconnecting such units. In one embodiment, coherency is maintained between one or more cache units 906 and cores 902-A-N.

In some embodiments, one or more of the cores 902A-N are capable of multithreading. The system agent 910 includes those components coordinating and operating cores 902A-N. The system agent unit 910 may include for example a power control unit (PCU) and a display unit. The PCU may be or include logic and components needed for regulating the power state of the cores 902A-N and the integrated graphics logic 908. The display unit is for driving one or more externally connected displays.

The cores 902A-N may be homogenous or heterogeneous in terms of architecture instruction set; that is, two or more of the cores 902A-N may be capable of execution the same instruction set, while others may be capable of executing only a subset of that instruction set or a different instruction set.

Exemplary Computer Architectures

FIGS. 10-13 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 10:
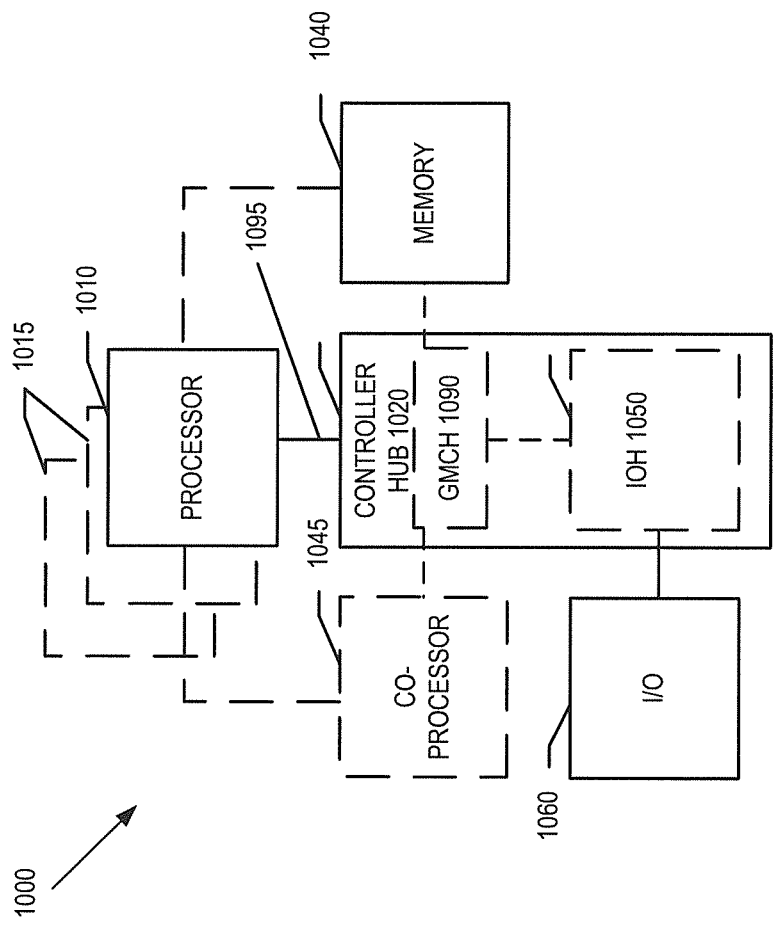
FIG. 10 is a block diagram of a system in accordance with one embodiment.

Referring now to FIG. 10, shown is a block diagram of a system 1000 in accordance with one embodiment of the present invention. The system 1000 may include one or more processors 1010, 1015, which are coupled to a controller hub 1020. In one embodiment the controller hub 1020 includes a graphics memory controller hub (GMCH) 1090 and an Input/Output Hub (IOH) 1050 (which may be on separate chips); the GMCH 1090 includes memory and graphics controllers to which are coupled memory 1040 and a coprocessor 1045; the IOH 1050 is couples input/output (I/O) devices 1060 to the GMCH 1090. Alternatively, one or both of the memory and graphics controllers are integrated within the processor (as described herein), the memory 1040 and the coprocessor 1045 are coupled directly to the processor 1010, and the controller hub 1020 in a single chip with the IOH 1050.

The optional nature of additional processors 1015 is denoted in FIG. 10 with broken lines. Each processor 1010, 1015 may include one or more of the processor cores described herein and may be some version of the processor 900.

The memory 1040 may be, for example, dynamic random access memory (DRAM), phase change memory (PCM), or a combination of the two. For at least one embodiment, the controller hub 1020 communicates with the processor(s) 1010, 1015 via a multi-drop bus, such as a frontside bus (FSB), point-to-point interface such as QuickPath Interconnect (QPI), or similar connection 1095.

In one embodiment, the coprocessor 1045 is a special-purpose processor, such as, for example, a high-throughput MIC processor, a network or communication processor, compression engine, graphics processor, GPGPU, embedded processor, or the like. In one embodiment, controller hub 1020 may include an integrated graphics accelerator.

There can be a variety of differences between the physical resources 1010, 1015 in terms of a spectrum of metrics of merit including architectural, micro-architectural, thermal, power consumption characteristics, and the like.

In one embodiment, the processor 1010 executes instructions that control data processing operations of a general type. Embedded within the instructions may be coprocessor instructions. The processor 1010 recognizes these coprocessor instructions as being of a type that should be executed by the attached coprocessor 1045. Accordingly, the processor 1010 issues these coprocessor instructions (or control signals representing coprocessor instructions) on a coprocessor bus or other interconnect, to coprocessor 1045. Coprocessor(s) 1045 accept and execute the received coprocessor instructions.

Figure 11:
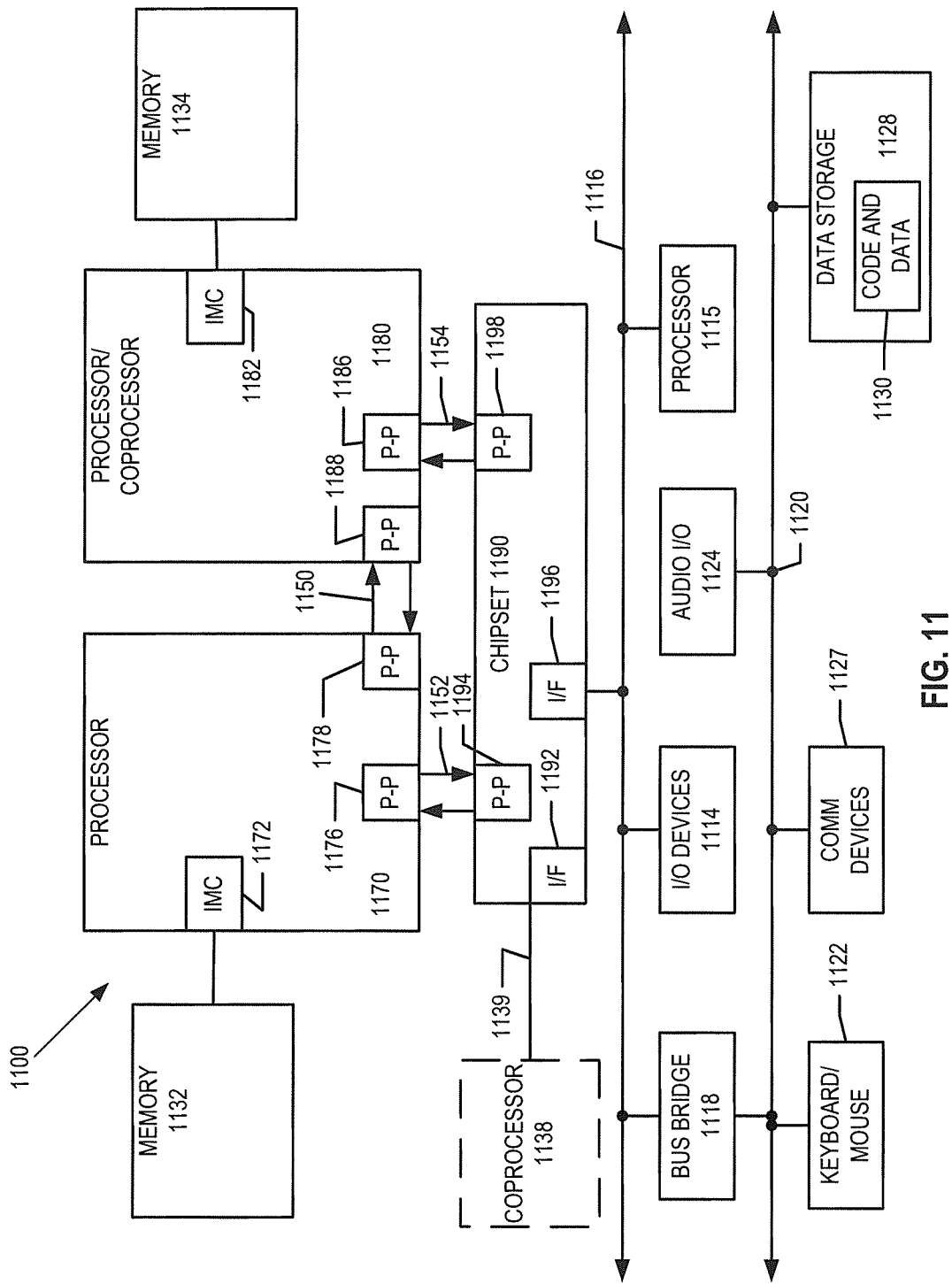
FIG. 11 is a block diagram of a second system in accordance with one embodiment.

Referring now to FIG. 11, shown is a block diagram of a first more specific exemplary system 1100 in accordance with an embodiment of the present invention. As shown in FIG. 11, multiprocessor system 1100 is a point-to-point interconnect system, and includes a first processor 1170 and a second processor 1180 coupled via a point-to-point interconnect 1150. Each of processors 1170 and 1180 may be some version of the processor 900. In one embodiment of the invention, processors 1170 and 1180 are respectively processors 1010 and 1015, while coprocessor 1138 is coprocessor 1045. In another embodiment, processors 1170 and 1180 are respectively processor 1010 coprocessor 1045.

Processors 1170 and 1180 are shown including integrated memory controller (IMC) units 1172 and 1182, respectively. Processor 1170 also includes as part of its bus controller units point-to-point (P-P) interfaces 1176 and 1178; similarly, second processor 1180 includes P-P interfaces 1186 and 1188. Processors 1170, 1180 may exchange information via a point-to-point (P-P) interface 1150 using P-P interface circuits 1178, 1188. As shown in FIG. 11, IMCs 1172 and 1182 couple the processors to respective memories, namely a memory 1132 and a memory 1134, which may be portions of main memory locally attached to the respective processors.

Processors 1170, 1180 may each exchange information with a chipset 1190 via individual P-P interfaces 1152, 1154 using point to point interface circuits 1176, 1194, 1186, 1198. Chipset 1190 may optionally exchange information with the coprocessor 1138 via a high-performance interface 1139. In one embodiment, the coprocessor 1138 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1190 may be coupled to a first bus 1116 via an interface 1196. In one embodiment, first bus 1116 may be a Peripheral Component Interconnect (PCI) bus, or a bus such as a PCI Express bus or another third generation I/O interconnect bus, although the scope of the present invention is not so limited.

As shown in FIG. 11, various I/O devices 1114 may be coupled to first bus 1116, along with a bus bridge 1118 which couples first bus 1116 to a second bus 1120. In one embodiment, one or more additional processor(s) 1115, such as coprocessors, high-throughput MIC processors, GPGPU's, accelerators (such as, e.g., graphics accelerators or digital signal processing (DSP) units), field programmable gate arrays, or any other processor, are coupled to first bus 1116. In one embodiment, second bus 1120 may be a low pin count (LPC) bus. Various devices may be coupled to a second bus 1120 including, for example, a keyboard and/or mouse 1122, communication devices 1127 and a storage unit 1128 such as a disk drive or other mass storage device which may include instructions/code and data 1130, in one embodiment. Further, an audio I/O 1124 may be coupled to the second bus 1120. Note that other architectures are possible. For example, instead of the point-to-point architecture of FIG. 11, a system may implement a multi-drop bus or other such architecture.

Figure 12:
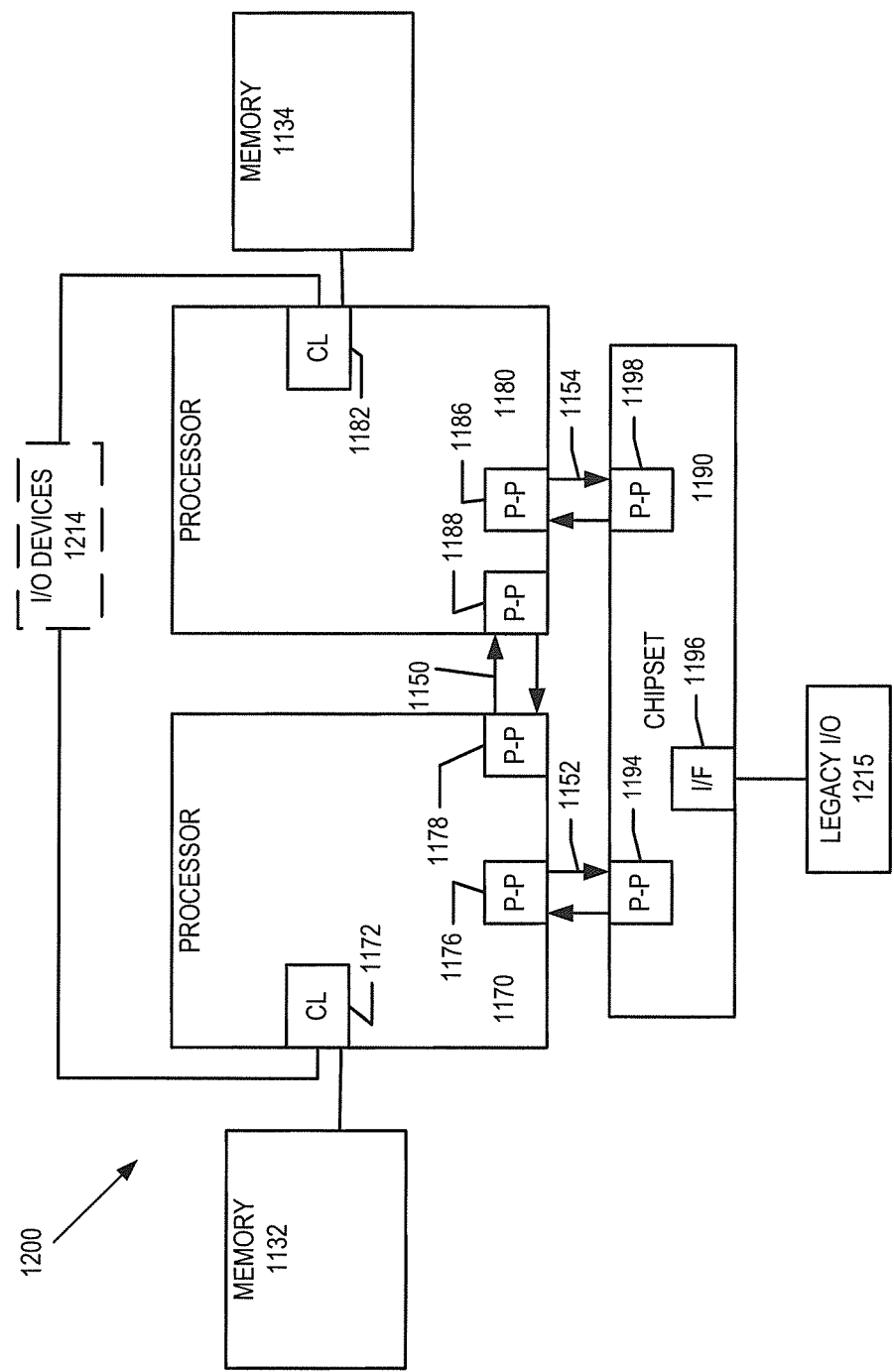
FIG. 12 is a block diagram of a third system in accordance with an embodiment of the invention.

Referring now to FIG. 12, shown is a block diagram of a second more specific exemplary system 1200 in accordance with an embodiment of the present invention. Like elements in FIGS. 11 and 12 bear like reference numerals, and certain aspects of FIG. 11 have been omitted from FIG. 12 in order to avoid obscuring other aspects of FIG. 12.

FIG. 12 illustrates that the processors 1170, 1180 may include integrated memory and I/O control logic ("CL") 1172 and 1182, respectively. Thus, the CL 1172, 1182 include integrated memory controller units and include I/O control logic. FIG. 12 illustrates that not only are the memories 1132, 1134 coupled to the CL 1172, 1182, but also that I/O devices 1214 are also coupled to the control logic 1172, 1182. Legacy I/O devices 1215 are coupled to the chipset 1190.

Figure 13:
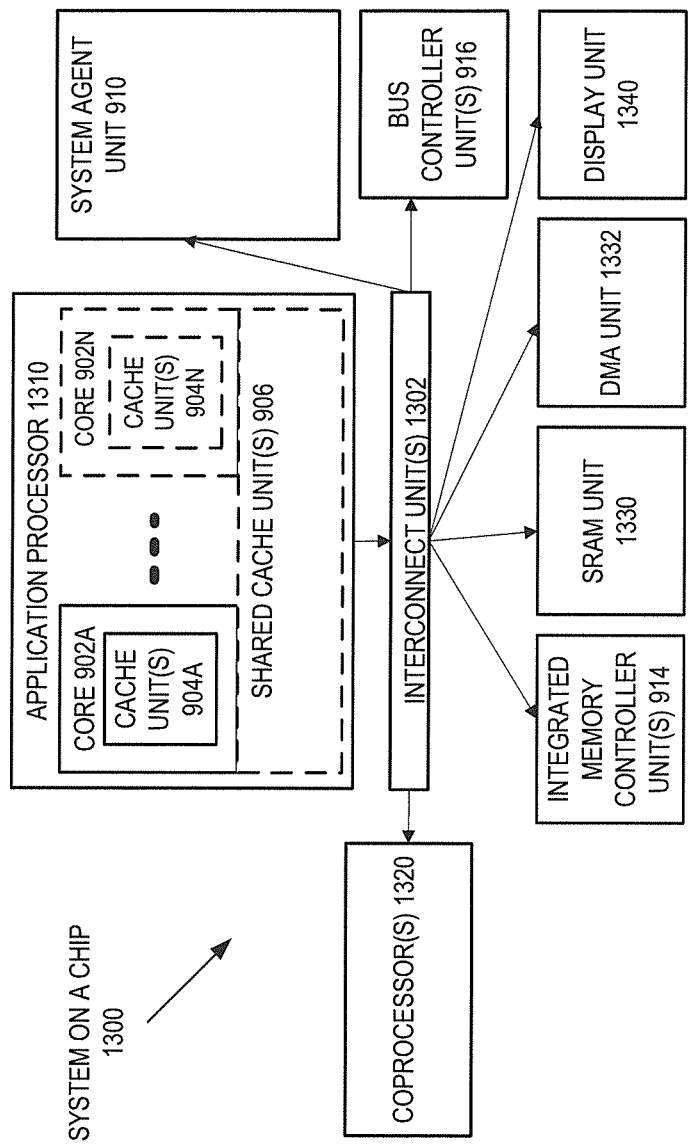
FIG. 13 is a block diagram of a system-on-a-chip (SoC) in accordance with one embodiment.

Referring now to FIG. 13, shown is a block diagram of a SoC 1300 in accordance with an embodiment of the present invention. Similar elements in FIG. 9 bear like reference numerals. Also, dashed lined boxes are optional features on more advanced SoCs. In FIG. 13, an interconnect unit(s) 1302 is coupled to: an application processor 1310 which includes a set of one or more cores 202A-N and shared cache unit(s) 906; a system agent unit 910; a bus controller unit(s) 916; an integrated memory controller unit(s) 914; a set or one or more coprocessors 1320 which may include integrated graphics logic, an image processor, an audio processor, and a video processor; an static random access memory (SRAM) unit 1330; a direct memory access (DMA) unit 1332; and a display unit 1340 for coupling to one or more external displays. In one embodiment, the coprocessor(s) 1320 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1130 illustrated in FIG. 11, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be readily modifiable in arrangement and detail as facilitated by enabling technological advancements without departing from the principles of the present disclosure or the scope of the accompanying claims.

What is claimed is:

1. A system comprising:
   memory to store an input data array including a plurality of input data elements;
   a register file including a first mask register, a second mask register, a first vector register and a second vector register; and
   execution circuitry coupled to the memory and the register file, the execution circuitry to perform a recursive computation on the first vector register for a plurality of iterations, more than one of the iterations including operations of:
  a vector load operation to load at least a portion of the input data elements from the input data array into the second vector register;
  a vector move operation to move the input data elements in the second vector register into the first vector register;
  a mask update operation to update the first and second mask registers to identify data elements in the first and second vector registers, respectively, that need further computation;
  a vector compute operation to operate over the data elements in the first vector register; and
  a vector store operation to store results of the vector compute operation into the memory.

2. The system of claim 1, wherein the execution circuitry performs the vector move operation to replace a given number of target data elements in the first vector register with the given number data elements in the second vector register, wherein each source data element corresponds to a mask bit in the second mask register having a second bit value, and wherein each target data element corresponds to a mask bit in the first mask register having a first bit value.

3. The system of claim 2, wherein the first bit value is an inverse of the second bit value.

4. The system of 2, wherein the first bit value is the same as the second bit value.

5. The system of claim 2, wherein the given number is the smaller one of the number of mask bits in the first mask register having the first bit value and the number of mask bits in the second mask register having the second bit value.

6. The system of claim 1, wherein the execution circuitry performs the mask update operation to update the first mask register and the second mask register, such that mask bits of the first mask register and the second mask register identify corresponding data elements of the first vector register and the second vector register, respectively, that need further computation.

7. The system of claim 1, wherein the execution circuitry performs the vector move operation in response to a vector move instruction, which specifies the first vector register, the first mask register, the second vector register and the second mask register as operands.

8. The system of claim 1, wherein the execution circuitry performs the mask update operation in response to a mask update instruction, which specifies the first mask register and the second mask register as operands.

9. A method comprising:
  storing an input data array including a plurality of input data elements in a memory;
  providing a register file including a first mask register, a second mask register, a first vector register and a second vector register; and
  performing a recursive computation, by execution circuitry coupled to the memory and the register file, on the first vector register for a plurality of iterations, more than one of the iterations including operations of:
    a vector load operation to load at least a portion of the input data elements from the input data array into the second vector register;
    a vector move operation to move the input data elements in the second vector register into the first vector register;
    a mask update operation to update the first and second mask registers to identify data elements in the first and second vector registers, respectively, that need further computation;
    a vector compute operation to operate over the data elements in the first vector register; and
    a vector store operation to store results of the vector compute operation into the memory.

10. The method of claim 9, wherein performing the vector move operation comprises replacing a given number of target data elements in the first vector register with the given number data elements in the second vector register, wherein each source data element corresponds to a mask bit in the second mask register having a second bit value, and wherein each target data element corresponds to a mask bit in the first mask register having a first bit value.

11. The method of claim 10, wherein the first bit value is an inverse of the second bit value.

12. The method of claim 10, wherein the first bit value is the same as the second bit value.

13. The method of claim 10, wherein the given number is the smaller one of the number of mask bits in the first mask register having the first bit value and the number of mask bits in the second mask register having the second bit value.

14. The method of claim 9, wherein performing the mask update operation to update the first mask register and the second mask register is performed such that mask bits of the first mask register and the second mask register identify corresponding data elements of the first vector register and the second vector register, respectively, that need further computation.

15. The method of claim 9, wherein performing the vector move operation in response to a vector move instruction comprises specifying the first vector register, the first mask register, the second vector register and the second mask register as operands.

16. The method of claim 9, wherein performing the mask update operation in response to a mask update instruction comprises specifying the first mask register and the second mask register as operands.

17. A non-transitory machine-readable medium having instructions that when processed by an execution circuit cause a method to be performed, said method comprising:
  storing an input data array including a plurality of input data elements in a memory;
  providing a register file including a first mask register, a second mask register, a first vector register and a second vector register; and
  performing a recursive computation, by execution circuitry coupled to the memory and the register file, on the first vector register for a plurality of iterations, more than one of the iterations including operations of:
    a vector load operation to load at least a portion of the input data elements from the input data array into the second vector register;
    a vector move operation to move the input data elements in the second vector register into the first vector register;
    a mask update operation to update the first and second mask registers to identify data elements in the first and second vector registers, respectively, that need further computation;
    a vector compute operation to operate over the data elements in the first vector register; and
    a vector store operation to store results of the vector compute operation into the memory.

18. The non-transitory machine-readable medium of claim 17, wherein performing the vector move operation comprises replacing a given number of target data elements in the first vector register with the given number data elements in the second vector register, wherein each source data element corresponds to a mask bit in the second mask register having a second bit value, and wherein each target data element corresponds to a mask bit in the first mask register having a first bit value.

19. The non-transitory machine-readable medium of claim 18, wherein the first bit value is an inverse of the second bit value.

20. The non-transitory machine-readable medium of claim 18, wherein the first bit value is the same as the second bit value.

21. The non-transitory machine-readable medium of claim 18, wherein the given number is the smaller one of the number of mask bits in the first mask register having the first bit value and the number of mask bits in the second mask register having the second bit value.

22. The non-transitory machine-readable medium of claim 17, wherein performing the mask update operation to update the first mask register and the second mask register is performed such that mask bits of the first mask register and the second mask register identify corresponding data elements of the first vector register and the second vector register, respectively, that need further computation.

23. The non-transitory machine-readable medium of claim 17, wherein performing the vector move operation in response to a vector move instruction comprises specifying the first vector register, the first mask register, the second vector register and the second mask register as operands.

24. The non-transitory machine-readable medium of claim 17, wherein performing the mask update operation in response to a mask update instruction comprises specifying the first mask register and the second mask register as operands.

* * * * *